United States Patent [19]
Zeeh et al.

[11] 3,862,208
[45] Jan. 21, 1975

[54] SUBSTITUTED N-(3-AMINOCARBONYLOXYPHENYL)-N-METHYLUREAS

[75] Inventors: Bernd Zeeh; Klaus Wulz, both of Ludwigshafen; Adolf Fischer, Mutterstadt, all of Germany

[73] Assignee: Badische Anilin- & Soda-Fabrik Aktiengesellschaft, Ludwigshafen/Rhein, Germany

[22] Filed: May 19, 1972

[21] Appl. No.: 254,879

[30] Foreign Application Priority Data
June 16, 1971  Germany............................ 2129773

[52] U.S. Cl................. 260/471 A, 71/105, 71/111, 260/463, 260/465 D, 260/471 C, 260/749 C
[51] Int. Cl........................................ C07c 127/18
[58] Field of Search......... 260/471 A, 479 C, 471 C

[56] References Cited
UNITED STATES PATENTS
3,663,605  5/1972  McCaully et al. ............... 260/471 A

*Primary Examiner*—Lorraine A. Weinberger
*Assistant Examiner*—L. A. Thaxton
*Attorney, Agent, or Firm*—Johnston, Keil, Thompson & Shurtliff

[57] ABSTRACT

Valuable substituted urea derivatives and a process for controlling the growth of unwanted plants.

13 Claims, No Drawings

SUBSTITUTED N-(3-AMINOCARBONYLOXYPHENYL)-N-METHYLUREAS

The present invention relates to new and valuable substituted ureas and their use as herbicides.

It is known that substituted ureas have a herbicidal action. For instance, British Pat. No. 1,195,715 describes the use as herbicide of N-(3-trifluoromethylphenyl)-N'-methyl-N'-hydroxycarbonylmethoxyurea

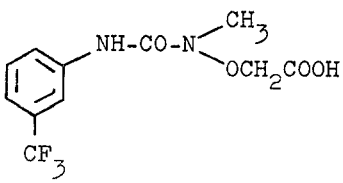

However, its action is unsatisfactory because unwanted plants are not combated to an adequate degree.

We have now found that substituted ureas of the formula

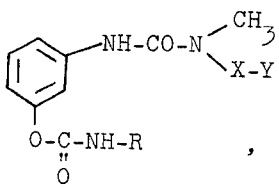

where R denotes alkyl of 1 to 5 carbon atoms, X denotes $OCH_2$, $CH_2$, $CH_2CH_2$, CO or

and Y denotes $NHR'$, $OR'$, CN or $COOR'$, $R'$ denoting hydrogen or alkyl of 1 to 5 carbon atoms, have a good herbicidal action.

The active ingredients are suitable for example for use as selective herbicides in cereals, Indian corn, sorghum and penauts, or as total herbicides. The action is particularly in evidence on Sinapis arvensis, Stellaria media, Matricaria chamomilla and Poa annua at application rates of 0.4 to 5 kg per hectare.

The agents according to the invention may be used as solutions, emulsions, suspensions or dusts. The form of application depends entirely on the purpose for which the agents are being used, in any case it should ensure a fine distribution of the active ingredient.

For the preparation of solutions to be sprayed direct, hydrocarbons having boiling points higher than 150°C, e.g. tetrahydronaphthalene or alkylated naphthalenes, or organic liquids having boiling points higher than 150°C and having one or more than one functional group, e.g., the keto group, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable by adding water. To prepare emulsions the ingredients as such or dissolved in a solvent may be homogenized in water or organic solvents by means of wetting or dispersing agents, e.g., polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g., kiesselguhr, talc, clay or fertilizers.

It is possible to add insecticides, fungicides, bactericides and other herbicides to the agents of the invention, and to mix them with fertilizers.

The following components may for example be used in combination with the compounds of the invention:

1. Substituted ureas
   N-phenyl-N',N'-dimethylurea
   N-(4-chlorophenyl)-N',N'-dimethylurea
   N-(3,4)-dichlorophenyl)-N',N'-dimethylurea
   N-(4-chlorophenyl)-N-benzoyl-N',N'-dimethylurea
   N-(4-chlorophenyl)-N'-methoxy-N'-methylurea
   N-(4-chlorophenyl)-N'-isobutynyl-N'-methylurea
   N-(3,4-dichlorophenyl)-N'-methoxy-N'-methylurea
   N-(4-bromophenyl-N'-methoxy-N'-methylurea
   N-(4-chlorophenyl)-N'-methyl-N'-butylurea
   N-(4-chlorophenyl)-N'-methyl-N'-isobutylurea
   N-(2-chlorophenoxyphenyl)-N',N'-dimethylurea
   N-(4-[4-chlorophenyl]-phenyl)-N',N'-dimethylurea
   N-(4-chlorophenyl)-N'-methyl-N'-(1-butyn-2-yl)-urea
   N-(benzothiazol-2-yl)-N,N'-dimethylurea
   N-(benzothiazol-2-yl)-N'-methylurea
   N-(3-trifluoromethyl-4-methoxyphenyl)-N',N'-dimethylurea
   N-(3-chloro-4-bromophenyl)-N'-methoxy-N'-methylurea
   N-(3-trifluoromethyl-4-isopropoxyphenyl)-N',N'-dimethylurea
   N-(3-trifluoromethylphenyl)-N',N'-dimethylurea
   N-(4-trifluoromethylphenyl)-N',N'-dimethylurea
   N-(4-chlorophenyl)-N'-(3'-trifluoromethyl-4'-chlorophenyl)-urea
   N-(3,4-dichlorophenyl)-N'-methyl-N'-butylurea
   N-(3-chloro-4-trifluoromethylphenyl)-N',N'-dimethylurea
   N-(3-chloro-4-ethylphenyl)-N',N'-dimethylurea
   N-(3-chloro-4-methylphenyl)-N',N'-dimethylurea
   N-(3-chloro-4-ethoxyphenyl)-N'-methyl-N'-methoxyurea
   N-(3-chloro-4-methoxyphenyl)-N',N'-dimethylurea
   N-(hexahydro-4,7-methanoindan-5-yl or 1- or 2-yl)-N',N'-dimethylurea
   N-2-methylcyclohexyl)-N'-phenylurea
   N-(4,6-dichloro-2-pyridyl)-N'-dimethylurea
   N'-cyclooctyl-N,N-dimethylurea dichloralurea
   N'-4-(4-methoxyphenoxy)-phenyl-N,N-dimethylurea
   N'-(3-methylphenyl)-N,N-dimethylthiourea
   1,1-dimethyl-3-[3-(N-tert-butylcarbamoxyloxy)-phenyl]-urea
   N-3,4-dichlorophenyl-N',N'-dimethyl-α-chloroformamidine
   N,N-dimethyl-N'-phenylurea trichloroacetate
   N,N-dimethyl-N'-4-chlorophenylurea trichloroacetate
   N-methyl-N-hydroxycarbonylmethoxy-N'-(4-fluorophenyl)-urea 2. Substituted triazines
   2-chloro-4,6-bis-(ethylamino)-s-triazine 2-chloro-4-ethylamino-6-isopropylamino-s-triazine
2-chloro-4,6-bis-(methoxypropylamino)-s-triazine
2-methoxy-4,6-bis-(isopropylamino)-s-triazine
2-diethylamino-4-isopropylacetamido-6-methoxy-s-triazine
2-isopropylamino-4-methoxyethylamino-6-methylmercapto-s-triazine
2-methylmercapto-4,6-bis-(isopropylamino)-s-triazine
2-methylmercapto-4,6-bis-(ethylamino)-s-triazine
2-methylmercapto-4-ethylamino-6-tert-butylamino-s-triazine
2-methylmercapto-4-ethylamino-6-isopropylamino-s-triazine
2-methylmercapto-4-methylamino-6-isopropylamino-s-triazine
2-methoxy-4,6-bis-(ethylamino)-s-triazine
2-methoxy-4-ethylamino-6-isopropylamino-s-triazine
2-chloro-4,6-bis-(isopropylamino)-s-triazine
2-azido-4-methylmercapto-6-isopropylamino-s-triazine
2-azido-4-methylmercapto-6-sec-butylamino-s-triazine
2-chloro-4-isopropylamino-6-(γ-methoxypropylamino)-s-triazine
2-(6-ethylamino-4-chloro-s-triazin-2-ylamino)-2-methylpropionitrile
2-chloro-4-diethylamino-6-isopropylamino-s-triazine
2-methoxy-4,6-bis-(3-methoxypropylamino)-s-triazine
2-methylmercapto-4-isopropylamino-6-(3-methoxypropylamino)-s-triazine
2-chloro-4-diethylamino-6-ethylamino-s-triazine
2,4-bis-(3-methoxypropylamino)-6-methylthio-1,3,5-triazine
2-methylthio-4-isopropylamino-6-(γ-methoxypropylamino)-1,3,5-triazine
2-chloro-4-ethylamino-6-tert-butylamino-s-triazine
2-(4-chloro-6-ethylamino-1,3,5-triazin-2-ylamino)-2-methylpropionitrile 3. Phenols
2,4-dinitro-6-sec-butylphenol or salts thereof
pentachlorophenol or salts thereof
2,4-dinitro-6-methylphenol
2,6-dibromo-4-cyanophenol
2,6-diiodo-4-cyanophenol
2,6-dichloro-4-cyanophenol salts + esters
dinitro-tert-butylphenol salts + esters
dinitro-sec-amylphenol salts + esters
2-ethoxymethyl-4,6-dinitrophenol salts + esters
2-tert-butyl-4,6-dinitro-5-methylphenol salts + esters 4. Carboxylic acids, salts and esters
2,4,6-trichlorophenylacetic acid
2,3,6-trichlorobenzoic acid and salts
2,3,5,6-tetrachlorobenzoic acid and salts
2,3,5,6-tetrachloroterephthalic acid
2-methoxy-3,5,6-trichlorobenzoic acid and salts
cyclopropanecarboxylic acid-2,4-dinitro-6-sec-butylphenyl ester
cyclopentanecarboxylic acid-2,4-dinitro-6-sec-butylphenyl ester
2-methoxy-3,6-dichlorobenzoic acid and salts
2-amino-2,5-dichlorobenzoic acid and salts
3-nitro-2,5-dichlorobenzoic acid and salts
2-methyl-3,6-dichlorobenzoic acid and salts
2,4-dichlorophenoxyacetic acid, salts and esters
2,4,5-trichlorophenoxyacetic acid, salts and esters
(2-methyl-4-chlorophenoxy)-acetic acid, salts and esters
2-(2,4,5-trichlorophenoxy)-propionic acid, salts and esters
2-(2,4,5-trichlorophenoxy)-ethyl-2,2-dichloropropionic acid,
salts and esters
4-(2,4-dichlorophenoxy)-butyric acid, salts and esters
4-(2-methyl-4-chlorophenoxy)-butyric acid, salts and esters
methyl-2-chloro-3-(4'-chlorophenyl)-propionate
2-chloro-9-hydroxyfluorene-9-carboxylic acid
endooxohexahydrophthalic acid
dimethyl tetrachlorophthalate
4-chloro-2-oxobenzothiazolin-3-ylacetic acid
2,2,3-trichloropropionic acid, salts and esters
2,2-dichloropropionic acid, salts and esters
(±)2-(2,4-dichlorophenoxy)-propionic acid, salts and esters
7-oxabicyclo-(2,2,1)-heptano-2,3-dicarboxylic acid
4-chlorophenoxyacetic acid, salts and esters
gibberellic acid
indolylacetic acid
indolylbutyric acid
(±)2-(4-chloro-2-methylphenoxy)-propionic acid, salts and esters
N,N-diallylchloro acetamide
naphthylacetic acid
N-1-naphthylphthalimic acid, salts and esters
4-amino-3,5,6-trichloropicolinic acid, salts and esters
trichloroacetic acid
4-(2,4,5-trichlorophenoxy)-butyric acid, salts and esters
2,3,5-triiodobenzoic acid, salts and esters
benzimidoxyacetic acid, salts and esters
ethylene glycol-bis-trichloroacetate
chloroacetic acid diethyl amide
2,6-dichlorothiobenzamide
2,6-dichlorobenzonitrile
N,N-dimethyl-α,α-diphenylacetamide
diphenylacetonitrile
N-hydroxymethy-2,6-dichlorothiobenzamide 5. Carbamic acid derivatives
carbanilic acid, isopropyl ester
3,4-dichlorocarbanilic acid, methyl ester
m-chlorocarbanilic acid, isopropyl ester
4-chloro-2-butynyl-m-chlorocarbanilate
isopropyl-m-trifluoromethylcarbanilate
2,6-di-tert-butyl-4-tolyl-N-methyl carbamate
3-(methoxycarbonylamino)-phenyl-N-3-tolyl carbamate
but-1-yn-3-yl-N-(3-chlorophenyl)-carbamate
4-chloro-2-butynyl-N-(3-chlorophenyl)-carbamate,
methyl-2-isopropyl-4-(methylcarbamoyloxy)-carbanilate;
further di-allate, N,N-dipropyl-S-ethylthiocarbamate, and dithiocarbamates of the formula

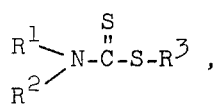

where R¹, R² and R³ denote lower alkyl or alkenyl or where R¹ and R² together with the nitrogen atom to which they are attached denote a 5-, 6- or 7-member optionally alkylated ring having a maximum of 6 or 7 carbon atoms the exo-alkyl groups having to be attached to the carbon atoms adjacent to the nitrogen atom, and $R^3$ denotes ethyl, propyl, n-butyl or isobutyl, especially N-butyl-N-ethyl-S-propyldithiocarbamate N,N-diisobutyl-S-propyldithiocarbamate
N,N,S-tripropyldithiocarbamate
N-isobutyl-N-allyl-S-propyldithiocarbamate
N-isobutyl-N-methallyl-S-ethyldithiocarbamate
N-isobutyl-N-methallyl-S-propyldithiocarbamate
N,N-dimethally-S-propyldithiocarbamate
N-butyl-N-ethyl-S-propylthiocarbamate and
N,N,S-tripropylthiocarbamate, N-(4-aminobenzosulfonyl)-methyl carbamate
1-methylprop-2-yl-N-(3-chlorophenyl)-carbamate
isopropyl-N-(3-chlorophenyl)-carbamate
S-2,3-dichloroally-N,N-diisopropylthiocarbamate
S-ethyl-N,N-dipropylthiolcarbamate
N-methyldithiocarbamic acid
S-propyl-N-butyl-N-ethylthiolcarbamate
3-(m-tolylcarbamoyloxy)-phenyl carbamate
isopropyl-N-phenyl carbamate
2-chloroallyl-N,N-diethyldithiocarbamate
methyl-N-(3,4-dichlorophenyl)-carbamate
S-2,3,3-trichloroallyl-N,N-diisopropylthiolcarbamate
S-propyl-N,N-dipropylthiolcarbamate
S-ethyl-N-ethylthiocyclohexanoic carbamate
3,4-dichlorobenzylmethyl carbamate
S-ethyl-N-hexahydro-1H-azepinethiolcarbamate
2,6-di-tert-butyl-4-methylphenyl-N-methyl carbamate
methyl-N-(4-nitrobenzosulfonyl)-carbamate
N,N-hexamethyl-S-isopropyl-(thiocarbamate)
S-ethyl-N,N-diisobutylthiolcarbamate
2-chlorobutynyl-N-(3-chlorophenyl)-carbamate
D-N-ethyl-2-(phenylcarbamoyloxy)-propionamide
S-ethyl-N,N-diisobutylthiolcarbamate
methyl-N'-(N'-methoxycarbamoylsulfanilyl)-carbamate 6. Anilides 3,4-dichloropropionanilide
3-chloro-4-bromopropionanilide
3-bromo-4-chloropropionanilide
cyclopropanecarboxylic acid-3,4-dichloroanilide
cyclopropanecarboxylic acid-3-chloro-4-bromoanilide
cyclopropanecarboxylic acid-3-bromo-4-chloroanilide
N-(3,4-dichlorophenyl)-2-methylpentanamide
N-1-naphthylphthalamic acid
N-(3-tolyl)-phthalamic acid
2-methacryl-3',4'-dichloroanilide
N-(4-chlorophenyl)-2,2-dimethylvaleramide
N-(3-chloro-4-methylphenyl)-2-methylpentanamide
α-chloro-N-isopropylacetanilide
α-chloro-N-but-1-yn-3-ylacetanilide
2-(α-naphthoxy)-N,N-diethylpropionamide
2-chloro-N-(2-methyl-6-tert-butylphenyl)-acetamide
2-chloro-N-(2,6-diethylphenyl)-N-methoxymethylacetamide
6-methyl-N-methoxymethyl-2-tert-butyl-α-bromoacetanilide
2-[(4-chloro-o-tolyl)-oxy]-N-methoxyacetamide
2-chloro-N-isopropylacetanilide 7. Organic phosphorus compounds tris-(2,4-dichlorophenoxyethyl)-phosphite
O-(2,4-dichlorophenyl)-O'-methyl-N-isopropylamidothiophosphate
N-[2-(O,O-diisopropyldithiophosphoryl)-ethyl]-benzosulfonamide
S,S,S-tributylthiophosphate 8. Miscellaneous compounds 4,5-dichloro-2-trifluoromethylbenzimidazole
2-chloroethyltrimethylammonium chloride
maleic hydrazide
4,5,7-trichlorobenzothiodiazole-2,1,3
3-amino-1,2,4-triazole
2-phenyl-3,1-benzoxazinone
N-butyl-N-ethyl-2,6-dinitro-4-trifluoromethylaniline
N-propyl-N-chloroethyl-2,6-dinitro-4-trifluoromethylaniline
N,N-di-(n-propyl)-2,6-dinitro-4-trifluoromethylaniline
N-allyl-N-chloroethyl-2,6-dinitro-4-trifluoromethylaniline
4-trifluoromethyl-2,4'-dinitrodiphenyl ether
2,4,6-trichloro-4'-nitrodiphenyl ether
4-trifluoromethyl-2,4'-dinitro-3'-methyldiphenyl ether
2,4-dichloro-4'-nitrodiphenyl ether
5-chloro-6-methyl-3-tert-butyluracil
5-bromo-6-methyl-3-sec-butyluracil
5-bromo-3-isopropyl-6-methyluracil
3-cyclohexyl-6-methyluracil
3-cyclohexyl-6-sec-butyluracil
3-cyclohexyl-5-bromouracil
3-cyclohexyl-5-chlorouracil
3-cyclohexyl-5,6-trimethyleneuracil
3-isopropyl-5-chlorouracil
2,3,6-trichlorobenzyloxypropanol
Hexachloro-2-propanone
sodium-2-(2,4,5-trichlorophenoxy)-ethyl sulfate
3,5-dibromo-4-hydroxybenzaldoxime-2',4'-dinitrophenyl ether
3,5-diido-4-hydroxybenzaldoxime-2',4'-dinitrophenyl ether
2,4-dinitrophenyl-2,4-dinitro-6-sec-butylphenyl carbonate
5-chloro-2-isopropylbenzimidazole
5-iodo-2-trifluoromethylbenzimidazole
3-cyclohexyl-6,7-dihydro-1H-cyclopentapyrimidine-2,4-(3H,5H)-dione
1,1'-ethylene-2,2'-dipyridylium dibromide
1,1'-dimethyl-4,4-bipyridylium di-(methylsulfate)
di-(methoxythiocarbonyl)-disulfide
2-methyl-4-(3'-trifluoromethylphenyl)-tetrahydro-1,2,4-oxadiazine-3,5-dione
6-chloro-2-difluoromethyl-3H-imidazole-(4,5-b)-pyridine
2-tert-butyl-6-chloroimidazo-(4,5-b)-pyridine
5-amino-4-bromo-2-phenylpyridazone-(3)
5-oxamido-4-bromo-2-phenylpyridazone-(3)
salt of dimethylaminoethanol
hexafluoroacetone hydrate
3,5-dinitro-4-dipropylaminobenzolsulfonamide
4-(methylsulfonyl)-2,6-dinitro-N,N-dipropylaniline
4-methyl-2,6-dinitro-N,N-dipropylaniline
5-amino-4-chloro-2-phenyl-3-pyridazone
5-dimethylamino-4-chloro-2-(3-trifluoromethylphenyl)-3-pyridazone
2,3,5-trichloro-4-pyridinol
3,4,5,6-tetrahydro-3,5-dimethyl-1,3,5-thiadiazine-2-thione sodium-2-(2,4-dichlorophenoxy)-ethyl sulfate
2,3-dichloro-1,4-naphthoquinone
di-(ethoxythiocarbonyl)-disulfide
3,5-dichloro-2,6-difluoro-4-hydroxypyridine
2-(3-tert-butylaminocarbonyloxyphenyl)-4-methyl-1,2,4-oxadiazolidene-3,5-dione
4-(3-tert-butylaminocarbonyloxyphenyl)-2-methyl-1,2,4-oxadiazolidine-3,5-dione
3-isopropyl-2,1,3-benzothiadiazin-4-one-2,2-dioxide
4-(3-trifluoromethylphenyl)-2-methyltetrahydro-1,2,4-oxadiazine-3,5-dione.

The new compounds may be prepared as illustrated below by reacting hydroxyl ureas with isocyanates. Parts in the examples are by weight.

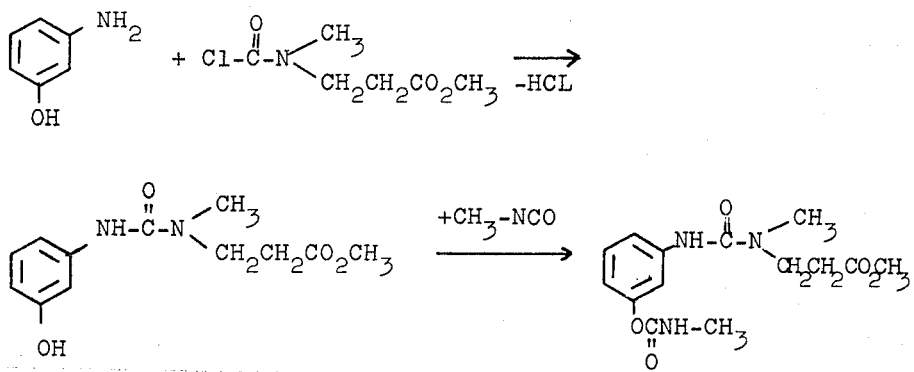

hydroxyphenyl)-N'-methyl-N'-(2-methoxycarbonylethyl)-urea, melting point: 120° – 121°C.

6.3. parts of the compound obtained in this manner is suspended in 25 parts of anhydrous dioxane and 0.3 part of triethylamine. While stirring, 1.4 parts of methyl isocyanate is added and the mixture heated at 50°C until a clear solution forms. The mixture is then cooled and left to stand for 24 hours. Precipitation is completed by adding 30 parts of water, the mixture is then filtered and the filter cake dried. There is obtained 4 parts of N-(3-methylcarbamoyloxyphenyl)-N'-methyl-N'-(2-methoxycarbonylethyl)-urea having a melting point of 80° to 81°C. The reaction proceeds in accoordance with the following equation:

EXAMPLE 1

While stirring, 6.3 parts of methyl isocyanate dissolved in 30 parts of anhydrous dioxane is dripped into a solution of 9.1 parts of N-(3-hydroxyphenyl)-N'-hydroxy-N'-methylurea in 70 parts of anhydrous dioxane and 1 part of triethylamine. After 20 hours the mixture is poured onto 100 parts of water and the whole filtered. The filter cake is dried and recrystallized from ethyl acetate. There is obtained 12 parts of N-(3-methylcarbamoyloxyphenyl)-N'-methyl-N'-methylcarbamoyloxyurea, which melts with decomposition at 172° to 173°C. The compound has the following structural formula:

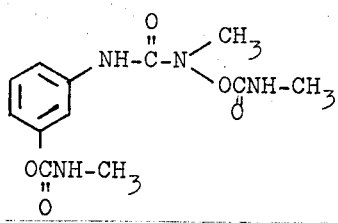

Similarly, the following compounds are obtained on employing isopropyl and tert-butyl isocyanate: N-(3-isopropylcarbamoyloxyphenyl)-N'-methyl-N'-isopropylcarbamoyloxyurea decomposing at 170° to 171°C, and N-(3-tertbutylcarbamoyloxyphenyl)-N'-methyl-N'-tert-butylcarbamoyloxyurea decomposing at 150° to 152°C.

EXAMPLE 2

While stirring, 35.8 parts of methyl 2-(N-chlorocarbonyl-N-methylamino)-propionate is dripped into a solution of 21.8 parts of 3-aminophenol in 100 parts of anhydrous toluene and 20.2 parts of triethylamine. After 12 hours the mixture is filtered, the filter cake is washed well with water, dried and recrystallized from methanol. There is obtained 26 parts of N-(3-

Similarly, N-(3-isopropylcarbamoyloxyphenyl)-N'-methyl-N-(2-methoxycarbonylethyl)-urea melting at 134° to 135°C is obtained from N-(3-hydroxyphenyl)-N'-methyl-N'-(2-methoxy-carbonylethyl)-urea and isopropyl isocyanate.

EXAMPLE 3

11.7 parts of ethyl methylaminoacetate is dissolved in 30 parts of anhydrous tetrahydrofuran. Then 23.4 parts of 3-tert-butylcarbamoyloxyphenyl isocyanate (German Laid-open Specification No. 1,961,720) dissolved in 20 parts of tetrahydrofuran is dripped in, the temperature rising to about 50°C. After 24 hours evaporation is carried out and the residue is triturated several times with diisopropyl ether and filtered. The filter cake is recrystallized from benzene. There is obtained 28 parts of N-(3-tert-butylcarbamoyloxyphenyl)-N'-methyl-N'-ethoxycarbonylmethylurea having a melting point of 150° to 151°C.

The compound has the following structural formula:

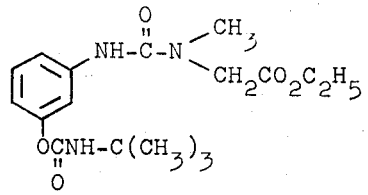

EXAMPLE 4

While stirring, 26 parts of methyl 2-methylaminopropionate is dripped into a solution of 50 parts of 3-tert-butylcarbamoyloxyphenyl isocyanate in 150 parts of anhydrous benzene; the temperature rises to about 40°C. The mixture is stirred for 10 hours and the precipitate formed is suction filtered and recrystallized from ethyl acetate. There is obtained 50 parts of N-(3-tert-butylcarbamoyloxyphenyl)-N'-methyl-N'-(2-methoxycarbonylethyl)-urea having a melting point of 108° to 109°C. The compound has the following structural formula:

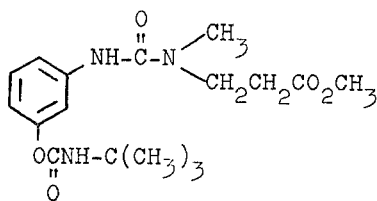

EXAMPLE 5

While stirring, a solution of 23.4 parts of 3-tert-butylcarbamoyloxyphenyl isocyanate in 60 parts of anhydrous tetrahydrofuran is dripped into a solution of 8.4 parts of 2-methylaminopropionitrile in 30 parts of anhydrous tetrahydrofuran; the temperature rises to about 45°C. The mixture is stirred for 1 hour and the precipitate is suction filtered and recrystallized from ethanol. There is obtained 15.7 parts of N-(3-tert-butylcarbamoyloxyphenyl)-N'-methyl-N'-(2-cyanoethyl)-urea having a melting point of 174° to 175°C. The compound has the following structural formula:

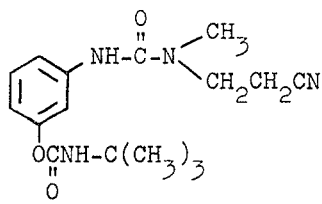

EXAMPLE 6

4.6 parts of methyl bromoacetate is added to a suspension of 7 parts of N'-hydroxy-N'-methyl-N-(3-tert-butylcarbamoyloxyphenyl)-urea in 45 parts of anhydrous methanol. While stirring, a solution of 1.4 parts of potassium hydroxide in 10 parts of anhydrous methanol is dripped in, a clear solution forming for a short period of time. After 12 hours 80 parts of water is added and the precipitate which forms is suction filtered after 2 hours and recrystallized from toluene. There is obtained 3.4 parts of N-(3-tert-butylcarbamoyloxyphenyl)-N'-methyl-N'-methoxycarbonylmethoxyurea having a melting point of 100° to 101°C.

The reaction proceeds in accordance with the following equation:

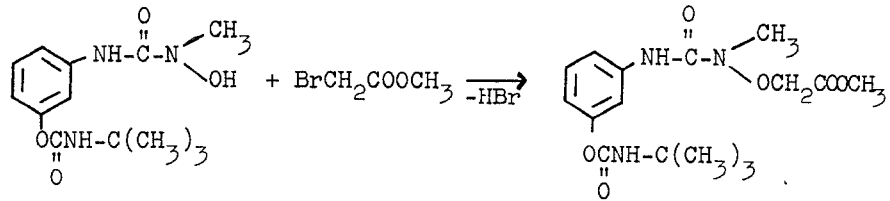

Starting from N'-hydroxy-N'-methyl-N-(3-isopropylcarbamoyloxyphenyl)-urea there is similarly obtained N-(3-isopropylcarbamoyloxyphenyl)-N'-methyl-N'-methoxycarbonylmethoxyurea having a melting point of 106° to 107°C (recrystallized from methanol).

EXAMPLE 7

22.4 parts of N-(3-hydroxyphenyl-)N'-methyl-N'-methoxy-carbonylurea and 0.1 part of triethylamine are suspended in 50 parts of anhydrous dioxane. 10 parts of tert-butyl isocyanate is added and the whole heated for 4 hours with stirring at 70°C, a clear solution forms. The mixture is subsequently poured onto ice water, washed thoroughly with water and dried. There is obtained 19 parts of N-(3-tert-butylcarbamoyloxyphenyl)-N'-methyl-N'-methoxycarbonylurea having a melting point of 132° to 134°C. The compound has the following structural formula:

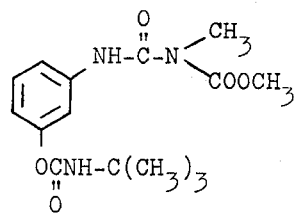

If isopropyl isocyanate is used, there is similarly obtained N-(3-isopropylcarbamoyloxyphenyl)-N'-methyl-N'-methoxycarbonylurea having a melting point of 123° to 125°C.

The following examples demonstrate the use of the compunds according to the invention.

EXAMPLE 8

On an agricultural plot the plants Zea mays, Sorghum, Sinapis arvensis, Stellaria media, Matricaria chamomilla, Poa annua and Echinochloa crus-galli were treated at a growth height of 2 to 17 cm with 1 kg per hectare of N-(3-tertbutylcarbamoyloxyphenyl)-N'-methyl-N'-(2-methoxycarbonylethyl)-urea (I) and, for comparison, 1 kg per hectare of N-3-trifluoromethylphenyl-N'-methyl-N'-hydroxycarbonyl-methoxyurea (II), each active ingredient being dispersed in 500 liters of water per hectare. After 3 to 4 weeks it was ascertained that I had a stronger herbicidal action that II combined with the same good crop plant compatibility.

The results of the experiment are given in the following table:

|  | Active ingredient | |
|---|---|---|
|  | I | II |
| Zea mays | 0 | 0 |
| Sorghum | 0 | 0 |
| Sinapis arvensis | 95 | 55 |
| Stellaria media | 95 | 50 |
| Matricaria chamomilla | 100 | 70 |
| Poa annua | 80 | 30 |
| Echinochloa crus-galli | 75 | 30 |
| 0 = no damage | 100 complete destruction | |

The action of the following compounds corresponds to that of I:

N-(3-methylcarbamoyloxyphenyl)-N'-methyl-N'-(2-methoxycarbonylethyl)-urea

N-(3-tert-butylcarbamoyloxyphenyl)-N'-methyl-N'-methoxycarbonylurea

N-(3-isopropylcarbamoyloxyphenyl)-N'-methyl-N'-isopropylcarbamoyloxyurea

N-(3-isopropylcarbamoyloxyphenyl)-N'-methyl-N'-(2-methoxycarbonyl-ethyl)-urea

N-(3-tert-butylcarbamoyloxyphenyl)-N'-methyl-N'-tert-butylcarbamoyloxyurea, and

N-(3-tert-butylcarbamoyloxyphenyl)-N'-methyl-N'-methoxycarbonylmethoxyurea.

EXAMPLE 9

Loamy sandy soil was filled into pots and sown with Zea mays, Triticum aestivum, Gossypium hirsutum, Sinapis arvensis, Chenopodium album, Stellaria media and Dactylis glomerata. The soil prepared in this manner was then treated with 3 kg per hectare of N-(3-tert-butylcarbamoyloxyphenyl)-N'-methyl-N'-(2-methoxycarbonylethyl)-urea (I) and 3 kg per hectare of N-(3-tert-butylcarbamoyloxyphenyl)-N'-methyl-N'-methoxycarbonylurea (II), each active ingredient being dispersed in 500 liters of water per hectare. After 4 to 5 weeks it was observed that in the case of both I and II the weeds Sinapis arvensis, Chenopodium album, Stellaria media and Dactylis glomerata were almost completely withered, whereas Zea mays, Triticum aestivum and Gossypium hirsutum continued to grow undamaged.

The action of the following compounds corresponds to that of I and II:

N-(3-methylcarbamoyloxyphenyl)-N'-methyl-N'-(2-methoxycarbonylethyl)-urea

N-(3-tert-butylcarbamoyloxyphenyl)-N'-methyl-N'-methoxycarbonylmethoxyurea and

N-(3-isopropylcarbamoyloxyphenyl)-N'-methyl-N'-methoxycarbonylmethoxyurea

EXAMPLE 10

90 parts by weight of compound I is mixed with 10 parts by weight of N-methyl-α-pyrrolidone. A mixture is obtained which is suitable for application in the form of very fine drops.

EXAMPLE 11

20 parts by weight of compound II from Example 9 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution innto 100,000 parts by weight of water and uniformly distributing it therein, an aqueous dispersion is obtained containing 0.02 percent by weight of the active ingredient.

EXAMPLE 12

20 parts by weight of compound I is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 13

20 parts by weight of compound I is dissolved in a mixture consisting of 25 parts by weight of cyclohexanol, 65 parts by weight of a mineral oil fraction having a boiling point between 210° and 280°C, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 14

20 parts by weight of compound I is well mixed with 3 parts by weight of the sodium salt of diisobutylnaphthalene-α-sulfonic acid, 17 parts by weight of the sodium salt of a ligninsulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1 percent by weight of the active ingredient.

EXAMPLE 15

3 parts by weight of compound I is intimately mixed with 97 parts by weight of particulate kaolin. A dust is obtained containing 3 percent by weight of the active ingredient.

EXAMPLE 16

30 parts by weight of compound I is intimately mixed with a mixture consisting of 92 parts by weight of powdered silica gel and 8 parts by weight of paraffin oil which has been sprayed onto the surface of this silica gel. A formulation of the active ingredient is obtaained having good adherence.

We claim:

1. A substituted urea of the formula

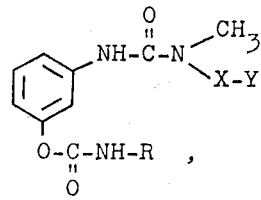

where R denotes alkyl of 1 to 5 carbon atoms, and in the combinations of X and Y which denote one of the groups —OOCNHR', —COOR', —CH$_2$COOR', —CH$_2$CH$_2$COOR' or —OCH$_2$COOR', R' denotes alkyl of 1 to 5 carbon atoms 2. A substituted urea as claimed in claim 1 wherein X and Y together denote the group —OOCNHR' wherein R' is alkyl of 1 to 5 carbon atoms.

3. A substituted urea as claimed in claim 1 wherein X and Y together denote the group —COOR' wherein R' is alkyl of 1 to 5 carbon atoms.

4. A substituted urea as claimed in claim 1 wherein X and Y together denote the group —CH$_2$COOR' or —CH$_2$CH$_2$COOR' wherein R' is alkyl of 1 to 5 carbon atoms.

5. A substituted urea as claimed in claim 1 wherein X and Y together denote the group —OCH$_2$COOR' wherein R' is alkyl of 1 to 5 carbon atoms.

6. A substituted urea as claimed in claim 1 wherein X and Y together denote the group 2-methoxycarbonylethyl.

7. A substituted urea as claimed in claim 1 wherein X and Y together denote the group methoxycarbonylmethoxy.

8. A substituted urea as claimed in claim 1 wherein X and Y together denote the group ethoxycarbonylmethyl.

9. N-(3-tert-butylcarbamoyloxyphenyl)-N'-methyl-N'-(2-methoxycarbonylethyl)-urea.

10. N-(3-tert-butylcarbamoyloxyphenyl)-N'-methyl-N'-methoxycarbonylmethoxyurea.

11. N-(3-tert-butylcarbamoyloxyphenyl)-N'-methyl-N'-ethoxycarbonylmethylurea.

12. N-(3-isopropylcarbamoyloxyphenyl)-N'-methyl-N'-(2-methoxycarbonylethyl)-urea.

13. N-(3-isopropylcarbamoyloxyphenyl)-N'-methyl-N'-methoxycarbonylmethoxyurea.

* * * * *